US012676303B2

(12) United States Patent
Oh et al.

(10) Patent No.: US 12,676,303 B2
(45) Date of Patent: Jul. 7, 2026

(54) NEGATIVE ELECTRODE ACTIVE MATERIAL, NEGATIVE ELECTRODE INCLUDING THE NEGATIVE ELECTRODE ACTIVE MATERIAL, AND SECONDARY BATTERY INCLUDING THE NEGATIVE ELECTRODE

(71) Applicant: LG ENERGY SOLUTION, LTD., Seoul (KR)

(72) Inventors: Il Geun Oh, Daejeon (KR); Eun Kyung Kim, Daejeon (KR); Yong Ju Lee, Daejeon (KR); Rae Hwan Jo, Daejeon (KR); Su Min Lee, Daejeon (KR); Jung Hyun Choi, Daejeon (KR); Dong Hyuk Kim, Daejeon (KR); Se Mi Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/138,449

(22) Filed: Apr. 24, 2023

(65) Prior Publication Data

US 2023/0282811 A1    Sep. 7, 2023

Related U.S. Application Data

(62) Division of application No. 16/650,743, filed as application No. PCT/KR2018/012455 on Oct. 19, 2018, now abandoned.

(30) Foreign Application Priority Data

Oct. 19, 2017    (KR) ........................ 10-2017-0135882

(51) Int. Cl.
| | |
|---|---|
| *H01M 4/36* | (2006.01) |
| *H01M 4/02* | (2006.01) |
| *H01M 4/48* | (2010.01) |
| *H01M 4/485* | (2010.01) |
| *H01M 4/587* | (2010.01) |
| *H01M 4/62* | (2006.01) |
| *H01M 10/0525* | (2010.01) |

(52) U.S. Cl.
CPC ........... *H01M 4/366* (2013.01); *H01M 4/483* (2013.01); *H01M 4/485* (2013.01); *H01M 4/587* (2013.01); *H01M 4/625* (2013.01); *H01M 10/0525* (2013.01); *H01M 2004/027* (2013.01)

(58) Field of Classification Search
CPC ...... H01M 4/366; H01M 4/483; H01M 4/485; H01M 4/505; H01M 4/525; H01M 4/587; H01M 4/625; H01M 2004/027; H01M 10/0525
See application file for complete search history.

(56) References Cited

U.S. PATENT DOCUMENTS

| | | | | |
|---|---|---|---|---|
| 6,083,644 A | * | 7/2000 | Watanabe ............. | H01M 4/131 |
| | | | | 429/231.1 |
| 2007/0148530 A1 | | 6/2007 | Lin et al. | |
| 2009/0004564 A1 | | 1/2009 | Ishida et al. | |
| 2011/0291055 A1 | | 12/2011 | Kojima et al. | |
| 2011/0294013 A1 | | 12/2011 | Bosnyak et al. | |
| 2013/0122373 A1 | * | 5/2013 | Tamura ................. | H01M 4/505 |
| | | | | 429/223 |
| 2013/0189575 A1 | * | 7/2013 | Anguchamy ......... | H01M 4/134 |
| | | | | 977/948 |
| 2014/0170485 A1 | | 6/2014 | Lee et al. | |
| 2014/0205907 A1 | | 7/2014 | Kang et al. | |
| 2015/0236340 A1 | | 8/2015 | Jung et al. | |
| 2015/0280223 A1 | | 10/2015 | Chang et al. | |
| 2015/0380729 A1 | * | 12/2015 | Kojima ............... | H01M 4/5825 |
| | | | | 429/223 |
| 2016/0118652 A1 | | 4/2016 | Wu et al. | |
| 2016/0197343 A1 | | 7/2016 | Jeong et al. | |
| 2016/0336592 A1 | | 11/2016 | Hirose et al. | |
| 2017/0117543 A1 | | 4/2017 | Park et al. | |
| 2017/0309903 A1 | * | 10/2017 | Peled .................... | H01M 4/366 |
| 2019/0006661 A1 | | 1/2019 | Matsuno et al. | |
| 2020/0058924 A1 | * | 2/2020 | Pang .................... | H01M 4/386 |

(Continued)

FOREIGN PATENT DOCUMENTS

| | | |
|---|---|---|
| CN | 102122708 A | 7/2011 |
| CN | 102891306 A | 1/2013 |
| CN | 103891014 A | 6/2014 |

(Continued)

OTHER PUBLICATIONS

X. Huang, H. Chen, H. Wang, S. Zhou, Y. Chen, B. Liu, et al., High-rate properties of Li1.95FeSiO4/C/CNTs composite as cathode material for lithium-ion batteries, Jul. 2012, Solid State Ionics, 220, pp. 18-22, https://doi.org/10.1016/j.ssi.2012.05.029 (Year: 2012).*
Morinobu Endo, Kenji Takeuchi, Kiyoharu Kobori, Katsushi Takahashi, Harold W. Kroto, A. Sarkar, Pyrolytic carbon nanotubes from vapor-grown carbon fibers, 1995, Carbon, 33, pp. 873-881, https://doi.org/10.1016/0008-6223(95)00016-7 (Year: 1995).*
I.A. Novoselova et al., Electrolytic synthesis of carbon nanotubes from carbon dioxide in molten salts and their characterization, Physica E: Low-dimensional Systems and Nanostructures, vol. 40, Issue 7, pp. 2231-2237, ISSN 1386-9477, (https://www.sciencedirect.com/science/article/pii/S138694) (Year: 2008).*
Extended European Search Report, dated Oct. 2, 2020, for European Application No. 18867921.1.
International Search Report for PCT/KR2018/012455 mailed on Apr. 11, 2019.

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

A negative electrode active material which includes a core including $SiO_x$ (0<x<2), a shell disposed on the core and includes lithium silicate, and a coating layer disposed on the shell and includes carbon nanotubes. Also, a method of preparing a negative electrode active material as well as a negative electrode and a battery including the same.

11 Claims, No Drawings

(56)  References Cited

U.S. PATENT DOCUMENTS

2021/0003139 A1* 1/2021 Miller ................... F04D 29/322

FOREIGN PATENT DOCUMENTS

| CN | 104332608 | A | | 2/2015 | |
|----|-----------|---|---|--------|---|
| CN | 104810506 | A | | 7/2015 | |
| CN | 104885269 | A | | 9/2015 | |
| CN | 105280890 | A | | 1/2016 | |
| CN | 105981202 | A | | 9/2016 | |
| CN | 106816594 | | * | 6/2017 | ........ H01M 10/0525 |
| EP | 1 760 822 | A2 | | 3/2007 | |
| EP | 3361537 | A1 | | 8/2018 | |
| JP | 2013-161705 | A | | 8/2013 | |
| JP | 2014-71948 | A | | 4/2014 | |
| JP | 5500047 | B2 | | 5/2014 | |
| JP | 2014-237583 | A | | 12/2014 | |
| JP | 6013125 | B2 | | 10/2016 | |
| JP | 2017-123281 | A | | 7/2017 | |
| KR | 10-2012-0139450 | A | | 12/2012 | |
| KR | 10-1241810 | B1 | | 4/2013 | |
| KR | 10-2014-0070261 | A | | 6/2014 | |
| KR | 10-2014-0070417 | A | | 6/2014 | |
| KR | 10-2014-0072663 | A | | 6/2014 | |
| KR | 10-1452027 | B1 | | 10/2014 | |
| KR | 10-2015-0071521 | A | | 6/2015 | |
| KR | 10-2015-0112746 | A | | 10/2015 | |
| KR | 10-1560892 | B1 | | 10/2015 | |
| KR | 10-2016-0031105 | A | | 3/2016 | |
| KR | 10-2016-0085089 | A | | 7/2016 | |
| KR | 10-2017-0048211 | A | | 5/2017 | |
| WO | WO 2014/204141 | A1 | | 12/2014 | |
| WO | WO 2017-061514 | A1 | | 4/2017 | |

* cited by examiner

NEGATIVE ELECTRODE ACTIVE MATERIAL, NEGATIVE ELECTRODE INCLUDING THE NEGATIVE ELECTRODE ACTIVE MATERIAL, AND SECONDARY BATTERY INCLUDING THE NEGATIVE ELECTRODE

CROSS-REFERENCE TO RELATED APPLICATIONS

This application is a Divisional of application Ser. No. 16/650,743 filed on Mar. 25, 2020, which is the U.S. National Phase of PCT/KR2018/012455, filed on Oct. 19, 2018, which claims the benefit of Korean Patent Application No. 10-2017-0135882, filed on Oct. 19, 2017, in the Korean Intellectual Property Office, the disclosures of which are incorporated herein in their entirety by reference.

TECHNICAL FIELD

The present invention relates to a negative electrode active material, a negative electrode including the negative electrode active material, and a secondary battery including the negative electrode, wherein, specifically, the negative electrode active material includes a core including $SiO_x$ ($0<x<2$); a shell which is disposed on the core and includes lithium silicate; and a coating layer which is disposed on the shell and includes carbon nanotubes.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator. The negative electrode includes a negative electrode active material in which lithium ions from the positive electrode are intercalated and deintercalated, and silicon-based particles having high discharge capacity may be used as the negative electrode active material. However, the silicon-based particle, such as $SiO_x$ ($0\leq x<2$), has limitations in that it has low initial efficiency, life characteristics are not excellent, and its volume is excessively changed during charge and discharge.

Typically, techniques for forming a coating layer on a surface of a silicon-based particle have been used to address this limitation. For example, a technique of forming a carbon coating layer including amorphous carbon on the surface of the silicon-based particle is being used (Korean Patent Application Laid-open Publication No. 10-2015-0112746). However, since it is insufficient to secure a conductive path only by the carbon coating layer including amorphous carbon, an effect of improving initial efficiency and life characteristics is not significant. Also, since a separate process for forming the carbon coating layer is required, there is a limitation in that a preparation process may not be simplified.

Thus, there is a need for a negative electrode active material capable of further improving the initial efficiency and life characteristics and a method of preparing a negative electrode active material by which the preparation process may be simplified.

PRIOR ART DOCUMENT

Patent Document

Korean Patent Application Laid-open Publication No. 10-2015-0112746

DISCLOSURE OF THE INVENTION

Technical Problem

An aspect of the present invention provides a negative electrode active material capable of improving initial efficiency and life characteristics, a negative electrode including the same, a secondary battery including the negative electrode, and a method of preparing a negative electrode active material by which a preparation process may be simplified.

Technical Solution

According to an aspect of the present invention, there is provided a negative electrode active material which includes: a core including $SiO_x$ ($0<x<2$); a shell which is disposed on the core and includes lithium silicate; and a coating layer which is disposed on the shell and includes carbon nanotubes.

According to another aspect of the present invention, there is provided a negative electrode including the negative electrode active material and a secondary battery including the negative electrode.

According to another aspect of the present invention, there is provided a method of preparing a negative electrode active material which includes: mixing $SiO_x$ ($0<x<2$) and $Li_2CO_3$; and performing a heat treatment on the mixed $SiO_x$ ($0<x<2$) and $Li_2CO_3$ with a catalyst in a $H_2$ gas atmosphere.

Advantageous Effects

According to the present invention, since a negative electrode active material includes lithium silicate, initial efficiency and capacity of a battery may be improved. Also, since the negative electrode active material includes carbon nanotubes, the initial efficiency and life characteristics of the battery may be improved and excessive volume expansion of a core during charge and discharge of the battery may be controlled. Since both of the lithium silicate and the carbon nanotubes may be formed in the negative electrode active material during the preparation of the negative electrode active material, a process of preparing the negative electrode active material may be simplified.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A negative electrode active material according to an embodiment of the present invention may include a core including $SiO_x$ ($0<x<2$); a shell which is disposed on the core and includes lithium silicate; and a coating layer which is disposed on the shell and includes carbon nanotubes.

The core may include $SiO_x$ ($0<x<2$), and, specifically, may include $SiO_x$ ($0<x\leq1$). Since the core includes $SiO_x$ ($0<x<2$), discharge capacity of a secondary battery may be increased.

The core may have an average particle diameter ($D_{50}$) of 1 μm to 30 μm, particularly 3 μm to 20 μm, and more particularly 4 μm to 7 μm. In a case in which the average particle diameter satisfies the above range, since a path necessary for diffusion of lithium ions is secured, electrode resistance is reduced and volume expansion of the electrode may be controlled. In the present specification, the average particle diameter ($D_{5G}$) may be defined as a particle diameter at 50% in the cumulative particle diameter distribution. The average particle diameter ($D_{50}$), for example, may be measured by using a laser diffraction method. The laser diffraction method may generally measure a particle diameter ranging from a submicron level to a few mm and may obtain highly repeatable and high-resolution results.

The shell may be disposed on the core. Specifically, the shell may cover at least a portion of a surface of the core. More specifically, the shell may cover the entire surface of the core.

The shell may include lithium silicate, and, specifically, the shell may include lithium silicate and $SiO_x$ ($0<x<2$). The $SiO_x$ ($0<x<2$) of the shell may be the same as the $SiO_x$ ($0<x<2$) of the core, and may specifically be $SiO_x$ ($0<x\leq1$), for example, $SiO$.

The lithium silicate may include at least one of $Li_2SiO_3$ and $Li_2Si_2O_5$. The lithium silicate may be formed by reaction of $Li_2CO_3$ with the $SiO_x$ ($0<x<2$) of the core or the shell. Since an amount of $SiO_2$ initially acting irreversibly may be reduced while the lithium silicate is formed, initial efficiency and capacity of the battery may be improved.

The lithium silicate may be included in an amount of 1 wt % to 45 wt %, particularly 1 wt % to 20 wt %, and more particularly 1 wt % to 12 wt % based on a total weight of the negative electrode active material. In a case in which the amount of the lithium silicate satisfies the above range, the initial efficiency and capacity of the battery may be improved.

The shell may have a thickness of 10 nm to 1 un, particularly 10 nm to 400 nm, and more particularly 50 nm to 350 nm. In a case in which the thickness satisfies the above range, since the path necessary for the diffusion of lithium ions is secured, the electrode resistance is reduced and the volume expansion of the electrode may be controlled.

The coating layer may be disposed on the shell. Specifically, the coating layer may cover at least a portion of a surface of the shell. More specifically, the coating layer may cover the entire surface of the shell.

The coating layer may include carbon nanotubes. Since a conductive path of the negative electrode active material may be secured by the carbon nanotubes, life characteristics of the secondary battery may be improved. The carbon nanotubes may be formed by reaction of $H_2$ gas with $CO_2$ generated during the formation of the lithium silicate.

The carbon nanotubes may have a diameter of 1 nm to 150 nm, particularly 1 nm to 100 nm, and more particularly 1 nm to 50 nm. The carbon nanotubes may have a length of 100 nm to 5 μm, particularly 100 nm to 3 μm, and more particularly 100 nm to 1 μm. In a case in which the diameter or length of the carbon nanotubes is satisfied, since the conductive path may be secured, the initial efficiency and life characteristics may be improved. The carbon nanotubes are formed by reaction of $Li_2CO_3$ and the core through a heat treatment in the presence of a catalyst during the preparation of the negative electrode active material, wherein the carbon nanotubes formed by such a method may have the above-described diameter and length.

The carbon nanotubes may be included in an amount of 0.1 wt % to 20 wt %, particularly 0.1 wt % to 15 wt %, and more particularly 0.1 wt % to 13 wt % based on the total weight of the negative electrode active material. In a case in which the amount of the carbon nanotubes satisfies the above range, since the conductive path may be sufficiently secured, the initial efficiency and life characteristics may be improved and excessive volume expansion of the core during charge and discharge may be controlled.

The coating layer may have a thickness of 10 nm to 1 μm, particularly 10 nm to 500 nm, and more particularly 10 nm to 300 nm. In a case in which the thickness satisfies the above range, a reduction in capacity due to the carbon nanotubes may be minimized while electrical conductivity is improved.

A negative electrode according to another embodiment of the present invention may include a negative electrode active material, and, herein, the negative electrode active material is the same as the negative electrode active material of the above-described embodiments. Specifically, the negative electrode may include a current collector and a negative electrode active material layer disposed on the current collector. The negative electrode active material layer may include the negative electrode active material. Furthermore, the negative electrode active material layer may further include a binder and/or a conductive agent.

The current collector is not particularly limited as long as it has conductivity without causing adverse chemical changes in the battery. For example, copper, stainless steel, aluminum, nickel, titanium, fired carbon, or aluminum or stainless steel that is surface-treated with one of carbon, nickel, titanium, silver, or the like may be used as the current collector. Specifically, a transition metal that adsorbs carbon well, such as copper or nickel, may be used as the current collector. The current collector may have a thickness of 6 μm to 20 μm, but the thickness of the current collector is not limited thereto.

The binder may include at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, polyacrylic acid, and polymers in which hydrogen thereof is substituted with lithium (Li), sodium (Na), or calcium (Ca), and may also include various copolymers thereof.

The conductive agent is not particularly limited as long as it has conductivity without causing adverse chemical changes in the battery, and, conductive materials, for example, graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

A secondary battery according to another embodiment of the present invention may include a negative electrode, a positive electrode, a separator disposed between the positive electrode and the negative electrode, and an electrolyte, and the negative electrode is the same as the above-described negative electrode. Since the negative electrode has been described above, detailed descriptions thereof will be omitted.

The positive electrode may include a positive electrode collector and a positive electrode active material layer which is formed on the positive electrode collector and includes a positive electrode active material.

In the positive electrode, the positive electrode collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode collector may typically have a thickness of 3 $\mu$m to 500 $\mu$m and may have a surface with fine roughness to improve adhesion to the positive electrode active material. The positive electrode collector may be used in various shapes, for example, a film, a sheet, a foil, a net, a porous body, a foam body, a non-woven fabric body, and the like.

The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-c2}M_{c2}O_2$ (where M is at least one selected from the group consisting of cobalt (Co), manganese (Mn), aluminum (Al), copper (Cu), iron (Fe), magnesium (Mg), boron (B), and gallium (Ga), and c2 satisfies $0.01 \leq c2 \leq 0.3$); lithium manganese composite oxide expressed by a chemical formula of $LiMn_{2-c3}M^{c3}O_2$ (where M is at least one selected from the group consisting of Co, Ni, Fe, chromium (Cr), zinc (Zn), and tantalum (Ta), and c3 satisfies $0.01 \leq c3 \leq 0.1$) or $Li_2Mn_3MO_8$ (where M is at least one selected from the group consisting of Fe, Co, Ni, Cu, and Zn); and $LiMn_2O_4$ having a part of Li being substituted with alkaline earth metal ions, but the positive electrode active material is not limited thereto. The positive electrode may be Li-metal.

The positive electrode active material layer may include a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder or metal fiber of such as copper, nickel, aluminum, and silver; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the positive electrode binder functions to improve binding between positive electrode active material particles and adhesion between the positive electrode active material and the positive electrode collector. Specific examples of the positive electrode binder may be polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, such a combined use may be more preferably used.

A lithium salt may be useed as the metal salt, and the lithium salt is a material that is readily soluble in the non-aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

A negative electrode according to another embodiment of the present invention is similar to the negative electrode of the above-described embodiment, but there is a difference in that the negative electrode further includes graphite-based active material particles. The graphite-based active material particles may be used by being mixed with the active material particles of the above-described embodiment which are composed of the core, the shell, and the coating layer. As a result, charge/discharge characteristics of the battery may be improved. The graphite-based active material particles may include at least one selected from the group consisting of artificial graphite, natural graphite, graphitized carbon fibers, and graphitized mesocarbon microbeads.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

A method of preparing a negative electrode active material according to another embodiment of the present invention may include: mixing $SiO_x$ ($0<x<2$) particles and $Li_2CO_3$; and performing a heat treatment on the mixed $SiO_x$ ($0<x<2$) particles and $Li_2CO_3$ with a catalyst in a $H_2$ gas atmosphere.

In the mixing, the $SiO_x$ ($0<x<2$) particles may have an average particle diameter ($D_{50}$) of 3 μm to 20 μm, for example, 4 μm to 7 μm.

The $Li_2CO_3$ may have an average particle diameter ($D_{50}$) of 100 nm to 5 μm, for example, 100 nm to 1 μm. In a case in which the average particle diameter satisfies the above range, since reactivity of $Li_2CO_3$ may be improved, an amount of unreacted $Li_2CO_3$ may be minimized, and thus, the desired amount of carbon nanotubes may be obtained.

A weight ratio of the $SiO_x$ ($0<x<2$) particles to the $Li_2CO_3$ may be in a range of 1:0.111 to 1:0.667, particularly 1:0.25 to 1:0.667, and more particularly 1:0.429 to 1:0.667. In a case in which the weight ratio satisfies the above range, since $SiO_2$ of the $SiO_x$ ($0<x<2$) particles may be sufficiently reduced, the initial efficiency of the battery may be improved, and the life characteristics of the secondary battery may be improved because the amount of the carbon nanotubes formed from the $Li_2CO_3$ is sufficient.

The performing of the heat treatment may include applying heat under specific conditions after the mixed $SiO_x$ ($0<x<2$) particles and $Li_2CO_3$ are introduced into a reaction furnace.

The performing of the heat treatment may be performed in a state in which the catalyst is mixed with the mixed $SiO_x$ ($0<x<2$) particles and $Li_2CO_3$. The catalyst plays a role in forming a deposit for forming carbon nanotubes from $Li_2CO_3$. The catalyst may include at least one oxide selected from the group consisting of Fe and Ca. Since both of the lithium silicate and the carbon nanotubes may be formed in the negative electrode active material by the heat treatment, the process of preparing the negative electrode active material may be simplified.

The $H_2$ gas plays a role in supplying hydrogen constituting the carbon nanotubes. The $H_2$ gas may be introduced into the reaction furnace. For the $H_2$ gas atmosphere, $H_2$ may be introduced into the mixed $SiO_x$ ($0<x<2$) and $Li_2CO_3$ at a flow rate of 500 sccm to 1,000 sccm for a time period of 30 minutes to 2 hours.

A temperature of the heat treatment may be in a range of 800° C. to 1,200° C., particularly 850° C. to 1,000° C., and more particularly 850° C. to 950° C. In a case in which the heat treatment temperature satisfies the above range, a phenomenon, in which the carbon nanotubes include side chain branches, may be suppressed.

The method of preparing a negative electrode active material may further include performing an acid treatment on the heat-treated $SiO_x$ ($0<x<2$) particles and $Li_2CO_3$ after the heat treatment. Specifically, the acid treatment may include stirring of the heat-treated $SiO_x$ ($0<x<2$) particles in 10 M to 12 M HCl for 10 minutes to 1 hour, but the present invention is not limited thereto. At least a portion of the lithium silicate and unreacted $Li_2CO_3$ may be removed by the acid treatment. Specifically, at least a portion of $Li_4SiO_4$, particularly, the entire $Li_4SiO_4$ of the lithium silicate may be removed.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLE AND COMPARATIVE EXAMPLES

Example 1: Preparation of Battery (1) Preparation of Negative Electrode Active Material
1) Preparation of Mixture of $SiO_x$ (0<x<2) Particles and $Li_2CO_3$ 6 g of SiO particles having an average particle diameter ($D_{50}$) of 5 μm and 4 g of $Li_2CO_3$ having an average particle diameter ($D_{50}$) of 1 μm were stirred for 10 minutes by using a ball mill to prepare a mixture.

2) Heat Treatment Process 3 g of the mixture and 0.3 g of Fe/CaO (iron oxide and calcium oxide), as a catalyst, were mixed and then introduced into a reaction furnace, a temperature of the reaction furnace was set to 900° C. while $H_2$ gas was introduced into the reaction furnace at a flow rate of 500 sccm, and the mixture was heat-treated for 3 hours. A material obtained after the heat treatment was stirred in 10 M HCl for 30 minutes and then filtered to prepare a negative electrode active material of Example 1. The results of checking the prepared negative electrode active material by a particle size analyzer, a transmission electron microscope (TEM), inductively coupled plasma-emission spectrometry (ICP), and thermogravimetric analysis are presented in Table 1.

(2) Preparation of Negative Electrode

The prepared negative electrode active material, graphite, carbon black as a conductive agent, and carboxylmethyl cellulose (CMC) and styrene butadiene rubber (SBR), as a binder, were mixed in a weight ratio of 4.8:91:1:1.7:1.5 to prepare 5 g of a mixture. A negative electrode slurry was prepared by adding 28.9 g of distilled water to the mixture. A 20 μm thick copper (Cu) thin film, as a negative electrode collector, was coated with the negative electrode slurry and dried. In this case, a temperature of circulating air was 60° C. Subsequently, the coated negative electrode collector was roll-pressed, dried in a vacuum oven at 130° C. for 12 hours, and then punched into a circle having an area of 1.4875 cm² to prepare a negative electrode.

(3) Preparation of Secondary Battery

The prepared negative electrode was used and a lithium (Li)-metal thin film cut into a circle of area 1.7671 cm² was used as a positive electrode. A porous polyethylene separator was disposed between the positive electrode and the negative electrode, and a lithium coin half-cell was prepared by injecting an electrolyte solution in which 0.5 wt % vinylene carbonate was dissolved and 1 M $LiPF_6$ was dissolved in a mixed solution in which a mixing volume ratio of ethyl methyl carbonate (EMC) to ethylene carbonate (EC) was 7:3.

Example 2: Preparation of Battery

A secondary battery was prepared in the same manner as in Example 1 except that 5 g of the SiO particles and 5 g of $Li_2CO_3$ were used in the preparing of the mixture of the $SiO_x$ (0<x<2) particles and $Li_2CO_3$ of Example 1.

Comparative Example 1: Preparation of Battery 3 g of SiO particles having an average particle diameter ($D_{50}$) of 5 μm and 0.3 g of Fe/CaO (iron oxide and calcium oxide), as a catalyst, were mixed and then disposed in a chamber, and a heat of 900° C. was applied for 3 hours while $CO_2$ was introduced into the chamber at a flow rate of 100 sccm. Thereafter, the heat-treated material was stirred in a 10 M HCl aqueous solution for 30 minutes and then filtered to dispose carbon nanotubes on the SiO particles. Thereafter, a negative electrode and a secondary battery were prepared by the same method as the method of preparing the negative electrode and secondary battery of Example 1.

TABLE 1

| Negative electrode active material | Example 1 | Example 2 | Comparative Example 1 |
|---|---|---|---|
| X value of Siox excluding lithium silicate | 0.6 | 0.3 | 1 |
| Average particle diameter ($D_{50}$) of core (μm) | 5 | 5 | 5 |
| Thickness of shell (nm) | 325 | 420 | 0 |
| Amount of lithium silicate based on total weight of negative electrode active material (wt %) | 10.4 | 40.4 | 0 |
| Thickness of coating layer (nm) | 200 | 350 | 250 |
| Amount of carbon nanotubes based on total weight of negative electrode active material (wt %) | 10.2 | 13.2 | 12.1 |

Experimental Example 1: Evaluation of Discharge Capacity, Initial Efficiency, and Capacity Retention The batteries of Examples 1 and 2 and Comparative Example 1 were charged and discharged to evaluate discharge capacity, initial efficiency, and capacity retention, and the results thereof are listed in Table 2 below.

In $1^{st}$ cycle and $2^{nd}$ cycle, the batteries were charged and discharged at 0.1 C, and charging and discharging were performed at 0.5 C from a $3^{rd}$ cycle to a $49^{th}$ cycle. A $50^{th}$ cycle was terminated in a charged state (state in which lithium was included in the negative electrode).

Charge condition: CC (constant current)/CV (constant voltage) (5 mV/0.005 C current cut-off)

Discharge condition: CC (constant current) condition 1.5 V

The discharge capacity (mAh/g) and the initial efficiency (%) were derived from the results during the first charge and discharge cycle. Specifically, the initial efficiency (%) was derived by the following calculation.

Initial efficiency (%)=(discharge capacity after the $1^{st}$ discharge/$1^{st}$ charge capacity)×100

The capacity retention was derived by the following calculation.

Capacity retention (%)=(discharge capacity in the $49^{th}$ cycle/discharge capacity in the first cycle)× 100

TABLE 2

| Battery | Discharge capacity (mAh/g) | Initial efficiency (%) | Capacity retention (%) |
|---|---|---|---|
| Example 1 | 408.2 | 90.2 | 74.2 |
| Example 2 | 405.1 | 90.5 | 72.6 |
| Comparative Example 1 | 401.6 | 87.5 | 71.3 |

Referring to Table 2, it may be understood that discharge capacity, initial efficiencies, and capacity retentions of Examples 1 and 2 were better than those of Comparative Example 1. The reason for this is that the lithium silicate was simultaneously formed while the carbon nanotubes were formed from $Li_2CO_3$.

The invention claimed is:

1. A method of preparing a negative electrode active material, the method comprising:

mixing $SiO_x$ particles and $Li_2CO_3$, wherein $0<x<2$; and performing a heat treatment on the mixed $SiO_x$ particles and $Li_2CO_3$ with a catalyst in a $H_2$ gas atmosphere to form lithium silicate and carbon nanotubes in the negative electrode active material, wherein the lithium silicate and the carbon nanotubes are simultaneously formed from the $Li_2CO_3$ in the heat treatment step.

2. The method of claim 1, wherein a weight ratio of the $SiO_x$ particles to the $Li_2CO_3$ is in a range of 1:0.111 to 1:0.667.

3. The method of claim 1, wherein the heat treatment is performed at a temperature range of 800° C. to 1,200° C.

4. The method of claim 1, wherein the catalyst comprises at least one oxide selected from the group consisting of iron (Fe) and calcium (Ca).

5. The method of claim 1, wherein the $H_2$ gas atmosphere is formed by introducing $H_2$ into the mixed $SiO_x$ particles and $Li_2CO_3$ at a flow rate of 500 sccm to 1,000 sccm for a time period of 30 minutes to 2 hours.

6. The method of claim 1, further comprising:

performing an acid treatment on the heat-treated $SiO_x$ particles and $Li_2CO_3$ after performing the heat treatment.

7. The method of claim 1, wherein the carbon nanotubes are formed by reaction of $H_2$ gas in the $H_2$ gas atmosphere with $CO_2$ generated during the formation of the lithium silicate.

8. The method of claim 1, wherein the lithium silicate comprises at least one of $Li_2SiO_3$ and $Li_2Si_2O_5$.

9. The method of claim 1, wherein the catalyst comprises at least one oxide selected from the group consisting of FeO and CaO.

10. The method of claim 1, wherein $0<x<1$.

11. The method of claim 1, wherein $0.3 \leq x \leq 0.6$.

* * * * *